US006773580B2

(12) United States Patent
Boger et al.

(10) Patent No.: US 6,773,580 B2
(45) Date of Patent: Aug. 10, 2004

(54) CATALYTIC REFORMING SYSTEM AND PROCESS

(75) Inventors: Thorsten R. Boger, Idstein Walsdorf (DE); Charles M. Sorensen, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 208 days.

(21) Appl. No.: 10/015,105

(22) Filed: Dec. 11, 2001

(65) Prior Publication Data

US 2003/0146131 A1 Aug. 7, 2003

(51) Int. Cl.[7] .......................... C10G 35/04; C10G 35/06
(52) U.S. Cl. ...................... 208/134; 208/135; 208/137; 208/138; 208/139; 208/136
(58) Field of Search ................................ 208/134, 135, 208/136, 137, 138, 139

(56) References Cited

U.S. PATENT DOCUMENTS

| | | | |
|---|---|---|---|
| 3,885,977 A | | 5/1975 | Lachman et al. |
| 3,909,452 A | | 9/1975 | Acres |
| 4,483,944 A | | 11/1984 | Day et al. |
| RE32,044 E | | 12/1985 | Atwood et al. |
| 4,631,267 A | | 12/1986 | Lachman et al. |
| 4,711,930 A | | 12/1987 | Hoelderich et al. |
| 4,862,836 A | * | 9/1989 | Chen et al. ........................ 123/3 |
| 4,884,531 A | * | 12/1989 | Degnan, Jr. et al. ............. 123/3 |
| 5,562,817 A | | 10/1996 | Mon et al. |
| 5,633,217 A | | 5/1997 | Lynn |
| 5,885,442 A | | 3/1999 | Lapunow et al. |
| 5,958,216 A | | 9/1999 | Glover |
| 5,958,217 A | | 9/1999 | Nacamuli et al. |
| 6,177,002 B1 | | 1/2001 | Glover |
| 6,207,042 B1 | * | 3/2001 | Holtermann et al. ........ 208/139 |
| 6,254,807 B1 | | 7/2001 | Schmidt et al. |
| 6,297,415 B1 | | 10/2001 | Bröcker et al. |
| 6,312,586 B1 | | 11/2001 | Kalnes et al. |

FOREIGN PATENT DOCUMENTS

| | | |
|---|---|---|
| WO | 97/26078 | 7/1997 |
| WO | 99/22864 | 5/1999 |

OTHER PUBLICATIONS

Parmaliana et al., "Catalytic Activity of Novel Pt Based High Surface Area Honeycomb Supports", Catalysis, 1987, pp 43–50.

Ramage et al., "KINPTR (Mobil's Kinetic Reforming Model): A Review of Mobil's Industrial Process Modeling Philosophy", Advances in Chemical Engineering, Academic Press, Inc., vol. 13, pp. 193–267 (1987).

Farrauto et al., "Fundamentals of Industrial Catalytic Processes", Chapman & Hall, London (1997), pp. 553–562.

* cited by examiner

Primary Examiner—Walter D. Griffin
(74) Attorney, Agent, or Firm—Kees van der Sterre

(57) ABSTRACT

Systems, processes, and reactors for the catalytic reforming of naphtha are provided. Embodiments of the invention include reactors comprising monolithic catalyst having honeycomb-type structure that allows for improved efficiency, productivity, and reaction selectivity over conventional catalytic reforming technology.

23 Claims, 4 Drawing Sheets

A

Monolithic Honeycomb Catalyst

B

CATALYTIC REFORMING SYSTEM AND PROCESS

FIELD OF THE INVENTION

The present invention relates to the field of catalytic reforming of petroleum distillates such as naphtha.

BACKGROUND OF THE INVENTION

Catalytic reforming of naphtha (petroleum distillate with a boiling point of about 70–200° C.) is a process used in refineries to upgrade naphtha to high-octane gasoline and to generate BTX-aromatics (i.e., benzene, toluene, xylene) which is a valuable feedstock for the petrochemical industry. The composition of raw naphtha typically includes alkanes and cycloalkanes together with smaller amounts of aromatics.

Naphtha reforming can be carried out by semi-regenerative (SR) catalytic reforming technology. The use of one or more fixed-bed, adiabatic reactors with interstage fired heating is the most common design, as shown in FIG. 1. Generally, the size of the reactors increases in the downstream direction. The main reforming reactions are highly endothermic, and interstage reheat is typically needed to maintain reactor inlet temperatures. During the reforming process, naphtha in the gas phase is contacted with catalyst contained in the adiabatic reactor vessels. Typically, catalyst is present as a solid bed of pellets through which the naphtha gas passes. A large excess of hydrogen gas is generally recycled in the process to reduce deactivation of the catalyst by coke laydown. Typically, the molar ratio of recycle gas to fresh naphtha feed ranges from about 3 to about 8.

In the reforming process there are four main classes of reactions, each of which is characterized by a different reaction rate. In addition to the main reactions, significant coke formation usually occurs, resulting in deactivation of the catalyst due to masking of the catalytically active sites. The amount of coke on the catalyst increases in the downstream direction and representative coke loadings of 5 wt %, 10 wt % and 15 wt % carbon in the first, second and third reactor of a 3-reactor unit are quite common at the end of a cycle. Table 1 lists the aforementioned reactions together with literature data for their relative reaction rates (Farrauto et al., *Fundamentals of Industrial Catalytic Processes*, Chapman & Hall, London (1997) and Ramage, et al., *Advances in Chemical Engineering*, Academic Press, Inc., vol. 13, pp. 193–267 (1987)).

TABLE 1

Reaction Classes in Naphtha Reforming

| Reaction Class | Relative Reaction Rate | Conditions | Desired/undesired |
| --- | --- | --- | --- |
| (1) Dehydrogenation | 180 | Favored by high T and low p (reaches equilibrium) | Desired (aromatics are formed) |
| (2) Isomerization | 7–12 | Favored kinetically by high T and p (reaches equilibrium) | Desired (e.g. n- to iso-paraffins) |
| (3) Dehydrocyclization | 0.04–1 | Favored by high T and low p (does not reach equilibrium) | Desired (paraffins to naphthenes) |
| (4) Hydrocracking | 0.1–4 | Favored kinetically by high T and p (does not reach equilibrium) | Not desired (C5+ yield loss to lights) |
| (5) Coking | slow | Favored by high T and low p | Undesired (catalyst deactivation, occurs as result of dehydro-genation and polymerization) |

From Table 1, it can be seen that favorable operating conditions generally occur at low pressure and high temperature. In semi-regenerative units, the operating pressures are usually in the range of about 17 to about 45 bar, and the temperatures at the reactor inlet are typically set to about 500 to about 550° C. To maintain the desired temperature, the process stream is reheated in between the reactors. Lower pressures, although desirable with respect to aromatics formation and gasoline octane, are generally avoided since they often result in significant increases in catalyst deactivation rate due to the formation of coke.

In order to operate at an optimum reactor pressure, a flat pressure profile is desired. Therefore, the pressure drop across the reactors should be as low as possible. This flat pressure profile is also of importance with respect to compressor loads and related operating expense since a large amount of hydrogen-rich gas is recycled. In practice, a small pressure drop is realized by using shallow, axial flow beds as were used mainly in older units, or radial flow reactors which are the dominating technology today. An example of a radial flow design is reported, for example, in U.S. Pat. No. 5,885,442. FIG. 2 shows a schematic of a radial flow reactor typically used in semi-regenerative naphtha reformers. To account for settling of the catalyst pellets during reactor heat-up and thermal expansion of the reactor vessel, and to avoid potential bypass of the reactant gases through the top section of the catalyst bed, additional catalyst is added beyond that needed in the direct flow path. This catalyst, called "slump & seal", is not used effectively for the main reactions, and often becomes highly coked due to the low flow rates present in that section of the reactor. In addition, the radial flow design includes a centerpipe and a secondary containment wall at the perimeter that contains the pellet catalyst in-between, further contributing to wasted space and reduction of the overall volumetric productivity of the reactor.

Due to the high cost of precious metal catalyst and the loss of production associated with frequent catalyst changeouts, semi-regenerative reforming catalysts are regenerated in the reactor on a regular basis. Since the main deactivation mechanism is due to coke deposition, this regeneration can be done by a controlled burn-off using dilute oxygen gas. In a subsequent step, the precious metals are redispersed on the catalyst support. During regeneration the unit is taken off-line and the regeneration gases are fed through the reactors. To control coke burning rate, the oxygen content and operating temperature are carefully controlled. If the oxygen concentration in the reactor inlet or the temperature are not controlled well, a hot spot can develop that can permanently damage the catalyst or cause severe mechanical damage to the reactor internals including the centerpipe, the scallop containment walls, or the reactor shell. After regeneration the catalyst is brought back to service. Due to some losses in activity caused by the regeneration process, the number of times catalyst can be regenerated is limited. A common problem with the regeneration procedure is that the flow conditions in the unused top space of the catalyst bed are badly defined (in standard operation, the desire is to have little or no gas flow in this section). It is not uncommon that in this section of the bed the oxidation is less controlled. In some cases, this results in temperatures above the limits of the catalyst and the reactor metallurgy, causing damage to the catalyst as well as the centerpipe, the reactor shell and other reactor internals. The economic impact due to replacement and downtime can be large.

The economic importance of catalytic reforming and other petroleum refining processes has led to the investigation and development of numerous catalyst materials and structures. For example, in Parmaliana, et al., *Catalysis*, 1987, 43–50, it is reported that crushed honeycomb catalyst shows activity with respect to certain reforming reactions. U.S. Pat. Nos. 6,177,002; 5,958,217; 5,958,216; and 5,562,817 pertain to catalytic reforming processes employing various catalyst staging strategies in which reactant stream is passed over varying catalyst compositions to improve selectivity and/or product yields. International patent application publication WO 99/22864 reports a homogenous catalyst bed containing catalyst particles with a concentration or species profile. WO 97/26078 reports the optimization of pressure drop in an axial flow fixed-bed reactor by grading catalyst particles of different sizes. These graded catalyst beds are said to be useful in processes such as hydrotreating, naphtha reforming, hydrocracking and hydroisomerization.

Catalyst structures having multiple channels in such a geometry that promotes heat exchange with the reactor walls for use in steam reforming processes are reported in U.S. Pat. No. Re. 32,044. Rigid honeycomb catalyst structures are reported in U.S. Pat. No. 3,909,452 for use in steam reforming or lowering nitrogen oxide levels in combustion effluent. Dehydrogenation processes using honeycomb catalysts have also been reported in U.S. Pat. No. 4,711,930 and U.S. Ser. No. 09/597,888, filed Jun. 19, 2000 entitled "Monolithic Catalyst Dehydrogenation Reactor."

In view of the above-described drawbacks and inefficiencies associated with conventional catalytic reforming as currently practiced by the petroleum refining industry, there is a clear need for continued improvement in many aspects of the process. For example, better use of reactor volume, improved flow distribution, and increased catalyst lifetimes are desired. The systems and processes described herein are directed to these and other apparent needs.

SUMMARY OF THE INVENTION

The present invention provides a system for catalytic reforming of naphtha, where the system comprises at least one reactor comprising a monolithic catalyst having honeycomb-type structure, and where the naphtha passes through the reactor along a flow path from a reactor inlet to a reactor outlet. According to some embodiments, flow path can be substantially axial. In further embodiments, geometry, including wall thickness and equivalent diameter of monolithic catalyst varies along the flow path. In some embodiments, monolithic catalyst can have substantially uniform geometry along the flow path. Additionally, composition of monolithic catalyst can vary along the flow path. According to some embodiments, monolithic catalyst can comprise gamma alumina which, in turn, can be coated on a ceramic honeycomb material. Monolithic catalyst can comprise Pt, Pd, Re, Ir, Sn, or chloride according to some embodiments. In some embodiments, monolithic catalyst can have an open frontal area percentage of from about 25 to about 90%, a cell density of from about 10 to about 2000 cpsi, and a wall thickness of from about 50 to about 1000 $\mu$m. In further embodiments, the reactor can further comprise heat exchange surfaces.

The present invention further provides for a system for catalytic reforming of naphtha, where the system comprises a plurality of reactors connected in series. The plurality of reactors can comprise a first reactor and at least one subsequent reactor, wherein each reactor of the plurality of reactors comprises a monolithic catalyst having honeycomb-type structure, and wherein the naphtha passes through the plurality of reactors sequentially beginning at the first reactor. According to some embodiments, at least one reactor of the plurality of reactors comprises an axial flow path. In some embodiments, the system comprises three or four reactors. Monolithic catalyst of at least two reactors of the plurality of reactors comprises substantially the same geometry or at least two reactors of the plurality of reactors comprises different geometry, according to some embodiments. In further embodiments, percentage of open frontal area of the monolithic catalyst of the first reactor is highest. According to some embodiments, equivalent diameter of the monolithic catalyst of the first reactor is smallest. In some embodiments, wall thickness of said monolithic catalyst of the first reactor is smallest.

The present invention further provides for a process for catalytic reforming of naphtha, where the process comprises any of the above systems described herein.

According to other embodiments, the present invention includes a reactor for catalytic reforming of naphtha, where the reactor comprises a monolithic catalyst having honeycomb-type structure, and where the monolithic catalyst has an open frontal area percentage of from about 25 to about 90%, a cell density of from about 10 to about 2000 cpsi, and a wall thickness of from about 50 to about 1000 $\mu$m.

In further embodiments, the present invention also includes a reactor for catalytic reforming of naphtha, where the reactor comprises a monolithic catalyst having honeycomb-type structure, and where the geometry of the monolithic catalyst is axially graded.

DESCRIPTION OF PREFERRED EMBODIMENTS

Figure 1:
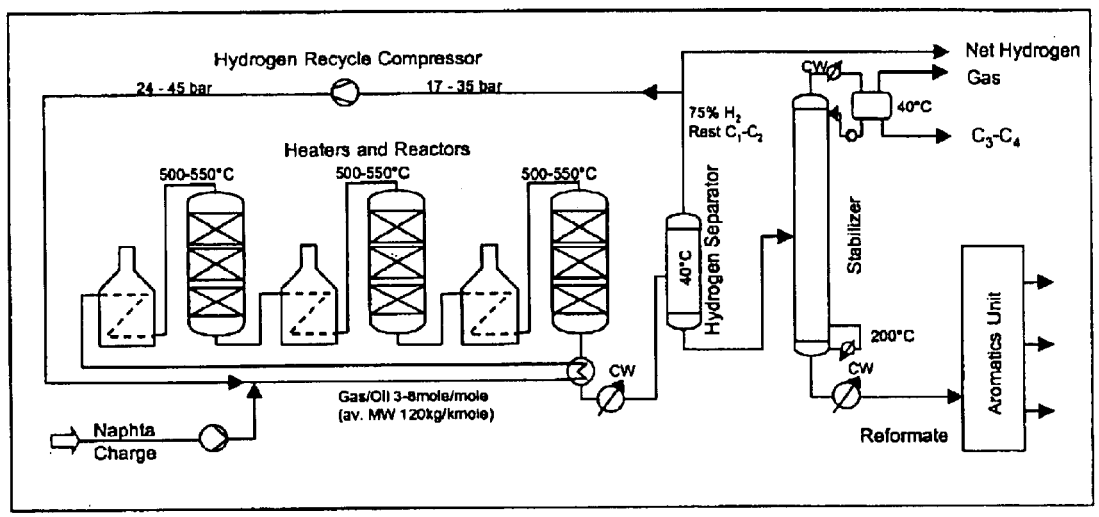
FIG. 1 shows a schematic of a conventional semi-regenerative naphtha reforming process, including an optional aromatics unit.
Figure 2:
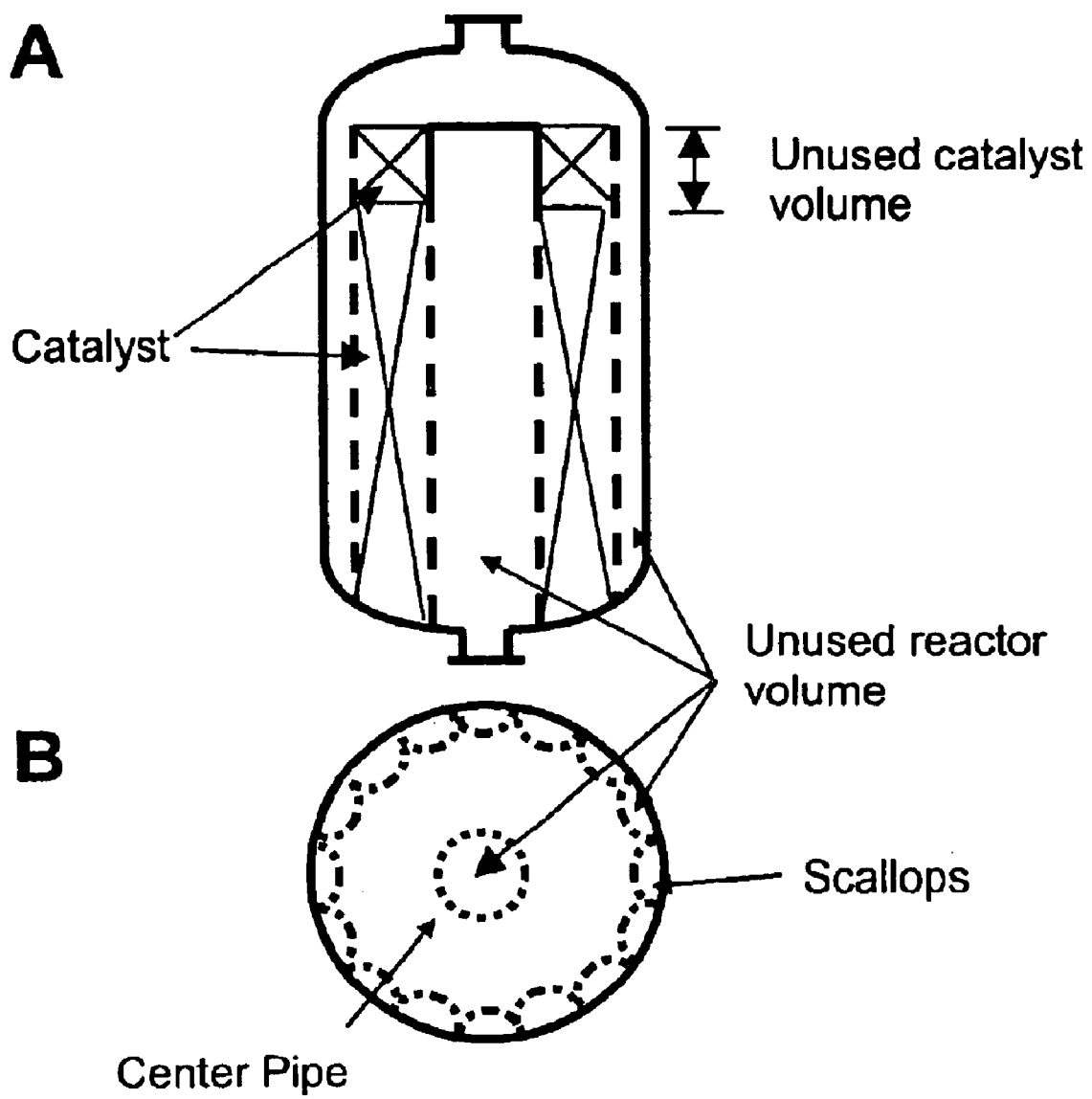
FIGS. 2A–2B show a schematic of a radial flow reactor used in conventional semi-regenerative naphtha reforming systems and processes.

The present invention includes, inter alia, catalytic reforming systems, processes, and reactors that incorporate a monolithic catalyst having honeycomb-type structure. Use of honeycomb catalyst results in improvements over conventional processes that use axial or radial flow reactors outfitted with catalyst particle beds.

As used herein, the phrase "catalytic reforming" is used in accordance with its meaning in the art. As discussed hereinbefore, catalytic reforming refers to, for example, a process for the upgrading of petroleum distillates, such as naphtha, to high-octane gasoline and the generation of BTX-aromatics. This is in contrast with "steam reforming" which is a different process typically used for the generation of syngas (CO and $H_2$). There are numerous differences distinguishing the two processes that are well recognized by one skilled in the art, and the term "reforming," as used herein, refers to "catalytic reforming" processes. Similarly, the phrase "naphtha reforming" refers to the catalytic reforming of naphtha distillate.

The term "reactant," as used herein, refers to a hydrocarbon feed stream. For naphtha reforming processes, the reactant comprises naphtha distillate. Reactant can enter a reactant through a reactor inlet and can exit through a reactor outlet. Typically, the inlet and outlet are situated at opposite ends of the reactor, defining the axis of the reactor. The path that reactant follows within a reactor from inlet to outlet is referred to as the "flow path." In some conventional reactors of semi-regenerative catalytic reforming units, flow path is radial, indicating that flow radiates outward from a central pipe lying along the axis of the reactor. In contrast, axial flow refers to a flow path that substantially follows the reactor axis.

"Monolithic catalyst" is well known in the art and refers to a solid phase catalyst exhibiting substantially uniform structure (or geometry) throughout. Monolithic catalysts tend to be provided as larger blocks of material, allowing easy and consistent orientation of intrinsic geometric features when packed (such as into a reactor). Monolithic catalysts can have honeycomb-type structure which is typically characterized by a regular, open cellular structure having a plurality of interconnecting pores and/or channels. "Geometry," or "geometric structure," of honeycomb-type catalysts refers to the structural features of the catalyst and describes material characteristics found with some degree of uniformity throughout the material. For example, geometry can include, inter alia, pore size, channel structure, channel diameter, cell density, wall thickness, void fraction, open frontal area (i.e., percentage of total surface area occupied by channels or void area), and the like. Monolithic catalysts having honeycomb-type structure can also be referred to as "monoliths," "monolithic catalysts," and "honeycomb catalysts."

Honeycomb-type catalysts can be made from any material that is capable of providing a porous structure. Catalytic materials can be dispersed onto the honeycomb structure in order to tailor catalytic activity for the reactions desired. Monolithic catalysts having honeycomb-type structure that are suitable for use in catalytic reforming can include any material capable of forming a honeycomb-type structure and providing a rigid honeycomb structural framework resistant to typical reforming and regeneration conditions. The honeycomb material can be inert or actively involved in catalytic reforming reactions. Suitable honeycomb materials include oxides of Si, Al, Ti, Zr, and the like. Accordingly, some honeycomb materials include ceramics and zeolites. The honeycomb structure can, in turn, support further catalytic or promoter materials suitable for naphtha reforming. For example, metals such as Pt, Pd, Ni, Re, Ir, Cu, Ni, Sn, Ge, other metals, and mixtures thereof, can be dispersed into a supporting honeycomb structure. Chloride can also be added to catalyst by treatment with HCl or other chloride sources.

Examples of honeycomb catalysts and their preparation are numerously described throughout the art and illustrated, for example, in Parmaliana, et al., *Catalysis*, 1987, 43, which is incorporated herein by reference in its entirety. According to some embodiments, metal catalysts can be generally applied to supporting honeycomb structures by impregnation or coating. Such metal catalysts can include, for example, compositions comprising about 0.1 to about 0.5 wt % Pt, about 0.0 to about 0.5 wt % Re, and/or about 0.1 to about 2.0 wt % chloride. Gamma alumina honeycomb structures, for example, can serve as supporting honeycomb materials for such metal catalysts. In some embodiments, gamma alumina can be coated on another ceramic honeycomb material. Examples of other ceramic honeycomb materials are described, for example, in U.S. Pat. Nos. 3,885,977; 4,483,944; 4,631,267; and 5,633,217, each of which is incorporated herein by reference in its entirety.

Some embodiments of the present invention provide for a system for the catalytic reforming of naphtha in which at least one reactor of the system comprises monolithic catalyst having honeycomb-type structure. According to this design, catalytic reforming processes can be improved over conventional processes because catalyst utilization can be increased while maintaining a desirably low pressure drop. To illustrate, in conventional processes catalyst is more efficiently utilized when particle size is smaller. That is, mass transfer is faster for catalysts having a smaller cross-sectional dimension. As a result, small catalyst particles are more desirable in catalytic reforming processes, however, smaller particles correlate with increased pressures. For example, in conventional processes that employ random packings of cylindrical or trilobe extrudates, pressure drop across a reactor increases significantly upon reduction in size of the catalyst particles. Conventional reactors typically use, for example, 1/16" trilobe catalyst (1.59 mm) in semi-regenerative systems. An even smaller catalyst size is desirable for better utilization of catalyst for the fast dehydrogenation reactions (See Table 1); however, smaller particles result in prohibitively high pressure drops. In contrast, reactors having honeycomb catalysts are not bound by the thickness-pressure relationship of conventional reactors because honeycomb-type catalysts are generally less resistant to flow. In honeycomb-type catalysts, mass transfer rate is a function of wall thickness (i.e., thickness of catalyst between pores or channels) as opposed to particle size. Thus, faster mass transfer can be achieved through the use of thinner catalyst walls, and catalyst can be better utilized without significant penalty on the pressure drop. Thin walls can offer the benefit of improved catalyst utilization, especially in regions of the reactor where the very fast dehydrogenation reactions occur (e.g., the first reactor in a series of reactors). As a result, less catalyst is required and the throughput is increased compared with conventional processes.

Selection of catalyst geometric and/or compositional gradients for maximizing the efficiency and optimizing yield of catalytic reforming reactions can include consideration of features affecting reaction selectivity. As shown in equation 1, selectivity is expressed as the ratio of the rate at which the desired and the undesired reactions occur.

$$S = \frac{r_{eff,desired}}{r_{eff,undesired}} = \frac{\eta_{desired} \cdot r_{intrinsic,desired}}{\eta_{undesired} \cdot r_{intrinsic,undesired}} \quad \text{eqn. (1)}$$

S represents the selectivity, $r_{eff}$ represents effective reaction rates of desired and undesired reactions as indicated, $r_{intrinsic}$ represents intrinsic reaction rates of desired and undesired reactions as indicated, and η represents the catalyst effectiveness factor for desired and undesired reactions as indicated. The catalyst effectiveness factor is a function of the ratio between the intrinsic reaction rate for a given reaction and the rate at which the mass transport inside the catalyst occurs. Accordingly, and as well known to one skilled in the art, catalyst effectiveness factor can be expressed as a function of the so-called Thiele modulus φ according to equation 2.

$$\phi = V_c/A_c(k_v/D_{eff})^{1/2} \quad (2)$$

Figure 4:
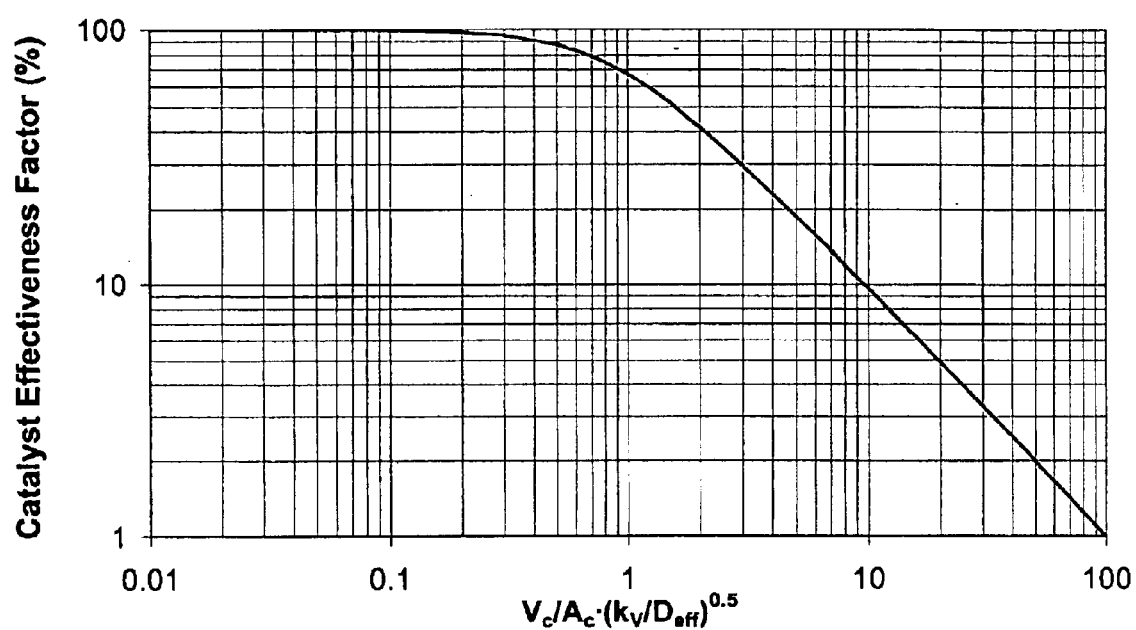
FIG. 4 shows a plot of catalyst effectiveness factor v. Thiele modulus.

For illustration purposes, $r_{intrinsic}$ corresponds to a first order reaction and the catalyst particles are substantially spherical. According to equation 2, $k_v$ is the first order reaction rate constant, $D_{eff}$ is the effective diffusion coefficient within the pores of the catalyst, and $V_c/A_c$ is the ratio of volume to surface area ratio for a catalyst particle. For a spherical catalyst particle, $V_c/A_c$ is proportional to diameter D, e.g., $V_c/A_c = D/6$. FIG. 4 shows the relationship between the catalyst effectiveness factor and the Thiele modulus. Generally, the catalyst effectiveness factor decreases with increasing intrinsic reaction rate ($k_v$) when the diffusion rates are the same. Hence, the undesired reactions tend to have a higher effectiveness factor even though their overall rates are smaller. For example, if it is assumed that a desired reaction has a Thiele modulus of 2, the catalyst effectiveness factor would be about 40%. If it is further assumed that the ratio between the intrinsic reaction rate of the desired and undesired reactions is 100, it is readily seen that the catalyst effectiveness factor of the undesired reaction is essentially 100%. By decreasing the diameter of the sphere by 50%, a 50% lower Thiele modulus of 1 would be obtained, effectively increasing the catalyst effectiveness factor of the desired reaction to about 67% while the catalyst effectiveness factor remains substantially unchanged for the undesired reaction. Thus, it can be seen from equation 1 that, for this example scenario, the selectivity can be increased by almost 68% (67%/40%=1.675). For catalyst shapes differing from the sphere, the same correlation can still be used for first order approximations by using equivalent diameter (ED) which is the diameter a sphere would have at the same $V_{c/Ac}$ as the actual catalyst particle.

Equivalent diameter in honeycomb-type catalyst ($ED_{honeycomb}$) is dependent on wall thickness (WT) and channel diameter (CD) and can be calculated according to equation 3.

$$ED_{honeycomb} = (3/2)\{2(WT) + (WT)^2/CD\} \quad (3)$$

Thus, mass transfer rates associated with honeycomb catalysts can be changed by independent variation of more than one physical parameter, e.g., WT or CD, unlike for particle catalysts. As such, honeycomb-type catalyst can provide better control of reaction selectivity.

According to some embodiments of the present invention, and unlike with conventional processes, the geometry and/or composition of honeycomb-type catalyst can be controllably varied along the flow path of a reactor. Catalyst that varies along a flow path changes either, or both, its composition or structural features (geometry) along reactant flow path within the reactor. Thus, as reactant composition predictably changes along its flow path through the reactor, catalyst features can also be tailored to facilitate desired reactivity and enhance selectivity, compensating for changes in reactant composition. Thus, variation of catalyst features allows greater control over reactor efficiency and productivity. For example, honeycomb geometric features such as wall thickness, channel diameter, equivalent diameter, pore size, cell density, open frontal area, and the like can be varied along the reactant flow path. In naphtha reforming processes, catalyst structure favoring the faster reforming reactions, such as reactions 1 and 2 of Table 1, can be placed earlier along the flow path (upstream). For example, catalyst having larger open frontal areas and/or thinner wall thicknesses can be situated upstream in the flow path. Accordingly, it is apparent that optimum catalyst utilization and productivity can be achieved by judicious combination of geometric and compositional variation within a reactor.

Variation of honeycomb catalyst within a reactor can include geometric and compositional gradients. Gradients can reside along the entire flow path or within portions of it. According to some embodiments, catalyst that is graded along the axis of the reactor is particularly suitable for axial flow reactors. For example, catalyst grading can be implemented to optimize selectivity for desired reactions over undesired reactions. In this way, selectivity can be adjusted such that the desirable reactions are continuously kinetically favored over the undesired reactions despite changes in reactant composition along the flow path. The product spectrum achieved during reforming, e.g., the distribution among the various BTX aromatics, can be optimized with graded catalyst. For example, catalyst can be graded such that wall thickness increases or decreases along the flow path in the direction of flow. Further, catalyst can be graded so that equivalent diameter increases or decreases along the flow path in the direction of flow. Accordingly, use of honeycomb-type catalyst provides yet another tool with which to better control and optimize reforming reactions for increased production of desired species.

According to some embodiments, reactors can comprise axially graded catalyst according to cell density. For example, cell density can decrease along the flow path of a reactor, from inlet to outlet, from about 1000 to about 10 cpsi, about 600 to about 50 cpsi, about 600 to about 400 cpsi, about 600 to about 500 cpsi, about 500 to about 400 cpsi, about 400 to about 300 cpsi, about 300 to about 200 cpsi, about 200 to about 100 cpsi, or any other appropriate range. Grading can be achieved incrementally, such as by increments of about 1 cpsi, about 5 cpsi, about 10 cpsi, about 50 cpsi, about 100 cpsi, or any other suitable increment. According to further embodiments, reactors can comprise axially graded catalyst according to wall thickness. For example, wall thickness can increase along the flow path, from inlet to outlet, in units of $\frac{1}{1000}$ of an inch from about 1 to about 100, about 5 to about 75, about 6 to about 40, about 7 to about 25, about 7 to about 17, about 10 to about 15, about 6 to about 15, about 15 to about 30, about 30 to about 40, or any other suitable range. Grading can be achieved incrementally (in $\frac{1}{1000}$ of an inch units), such as by increments of about 1, 2, 5, 10, 20 or other suitable increments. Additionally, reactors can have cell density or wall thickness grading in combination with other gradings including both compositional (as in chemical composition of catalyst) and structural (geometric) gradings.

Other embodiments of the present invention include systems that comprise a plurality of reactors, where at least one reactor comprises a monolithic catalyst having honeycomb-type structure. In some embodiments, each reactor of the plurality of reactors comprises honeycomb catalyst. As with conventional catalytic reforming systems, the reactors (sometimes referred to as beds, as in catalyst beds) can be connected in series, allowing reactant to flow sequentially through each reactor. Accordingly, the reactor that initially receives reactant feed (i.e., the most upstream reactor) can be considered as the "first reactor." Reactors that receive reactant after the first reactor (downstream from the first reactor) can be considered as "subsequent reactors," and the reactor to last receive reactant would be the "last reactor." Systems having 2, 3, 4, 5, or more reactors are suitable.

A plurality of reactors allows for multi-stage systems in which honeycomb catalyst differs between at least two of the reactors. In some embodiments, each reactor of the staged system comprises different honeycomb catalysts having different geometry and/or composition. In this way, as with the catalyst grading described above, reaction selectivity can be optimized and the catalytic reforming process can be made more efficient. For example, upstream reactors, such as the first reactor, can comprise honeycomb catalyst having thinner wall thickness than catalyst in down stream reactors so that use of catalyst is optimized with respect to the fast reforming reactions. Similarly, open frontal area can be highest in the first reactor, decreasing in subsequent reactors. Of course, systems in which each reactor comprises the same honeycomb catalyst are also contemplated by the present invention. A system comprising staged monolithic catalyst is provided in Example 2.

Systems having a plurality of reactors can also include at least one reactor having graded honeycomb catalyst. In some embodiments, systems can comprise both grading and staging. The combination of staging and grading can provide greater control over selectivity and efficiency than typically available in conventional systems. In some embodiments, a system can include several reactors, each having differently graded catalyst. For example, wall thickness can increase along the flow path of each reactor of a system and each reactor can have a different range of wall thicknesses. More particularly, as an example, wall thickness can be graded from about 50 $\mu$m to about 100 $\mu$m in a first reactor, and a subsequent reactor of the same system can have a wall thickness grading of from about 100 $\mu$m to about 200 $\mu$m. As such, all reasonable combinations of staging and grading of catalyst composition and structure can be considered.

Reactors comprising honeycomb-type catalyst according to the present invention can be readily made. For example, now-existing conventional reactors can be easily modified by removing existing hardware, such as the center pipe and catalyst containment structure, and outfitting the reactor with honeycomb-type catalyst. Honeycomb catalyst can be packed by stacking blocks of catalyst within the reactor. Stacking easily allows axial grading of catalyst composition and geometry. Catalyst can occupy all the space of the reactor, including what used to be non-catalyst areas such as the area occupied by centerpipe and scalloped edges of conventional reactors. Not only is substituting the monolithic honeycomb-type catalyst for the radial flow randomly packed reactor design cost effective, even when the combined volume of the monolithic packings in the axial flow reactor remains the same as the volume of the packed bed catalyst in the replaced radial stage, as much as 50% of the reactor space can be saved. This extra space can be used to install heating means between the monolithic packing elements of the axial flow reactor, with two or even three internal heat exchangers imparting significant performance improvements to the system.

Moreover, axial flow reactors comprising monolithic catalyst do not require the use of slump and seal catalyst at one end (usually the top) of the reactor, such as is used in conventional radial flow designs. Since this area is designed for minimal flow, significant quantities of coke can deposit there during a run. Regenerating this catalyst area by carbon oxidation of deposited coke is difficult and known to cause numerous operating and mechanical problems due to uncontrolled, exothermic oxidation. The use of monolithic catalyst in axial flow beds eliminates the low-flow area thereby avoiding significant coke laydown and the problems associated with it. As a result, catalyst regeneration can be safer and easier to accomplish.

Figure 3:
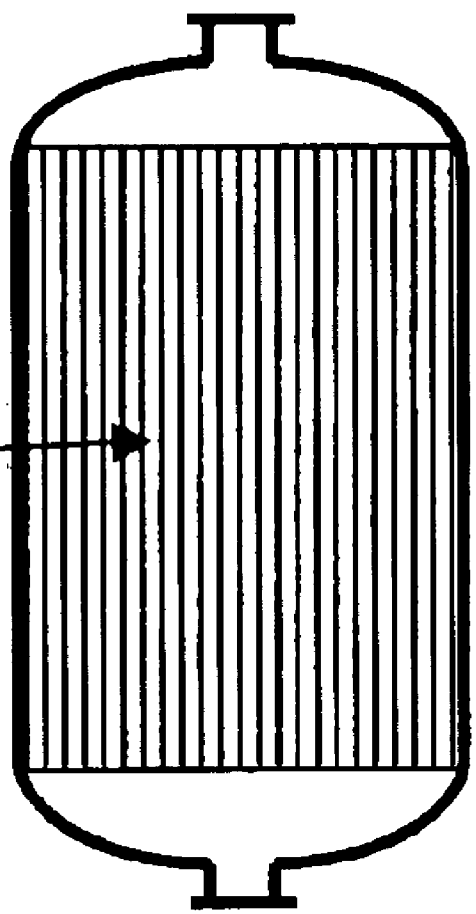
FIGS. 3A–3B show a schematic of an axial flow reactor comprising honeycomb-type catalyst according to some embodiments of the present invention.
Figure 3:
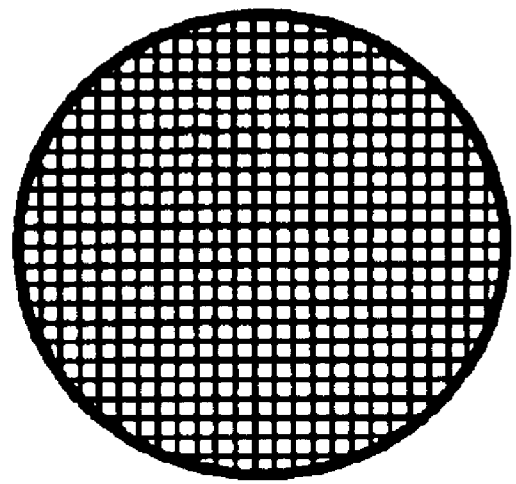

A reactor according to some embodiments of the present invention is shown in FIGS. 3A and 3B. The upper diagram (FIG. 3A) outlines an axial flow reactor comprising honeycomb-type catalyst oriented such that catalyst channels (indicated as vertical lines and not shown to scale) run substantially axially along the flow path. An inlet and an outlet for reactant feed are also shown, situated at opposite ends of the reactor. The lower diagram (FIG. 3B) illustrates that catalyst, unlike in conventional reactors, can occupy the entire cross section, ensuring that reactant does not bypass catalyst.

For the catalytic reforming of naphtha, suitable honeycomb-type catalysts can be described according to certain structural characteristics. For example, wall thickness can be from about 50 to about 1000 $\mu$m, about 50 to about 500 $\mu$m, about 50 to about 250 $\mu$m, or any subrange thereof. Open frontal area percentage can be from about 10% to about 90%, from about 25% to about 90%, from about 35% to about 90%, or any subrange thereof. Cell density can be from about 10 to about 2000 cpsi, about 20 to about 1000 cpsi, or about 50 to about 500 cpsi, including any subrange thereof.

As apparent from the present disclosure, the benefits of using honeycomb-type catalyst in catalytic reforming processes are numerous. For example, a larger portion of the reactor volume can be used for the catalyst, including the slump & seal area, the centerpipe, and the scallop wall volumes. Improved catalyst utilization results since the flow distribution is more even, eliminating zones with undefined flow conditions which typically cause problems during regeneration (burn-off of coke). Additionally, thinner catalyst walls can be used which contributes to a higher catalyst effectiveness factor. Consequently, honeycomb-type catalyst can allow for, inter alia, more throughput at same space velocity, longer cycle times between regenerations and catalyst exchange, and the integration of additional heat exchangers by utilizing newly opened space inside the reactor vessels. Additionally, reactor design becomes significantly simpler and more cost effective, e.g. no expensive centerpipes and scallops are required, resulting in, for example, direct savings on capital investment and reduced operational risks due to safer and more reliable regeneration. Further, axial flow combined with the unique geometric properties of honeycomb-type catalyst allows for axial grading of catalyst structure. Not possible for radial flow reactors having randomly packed catalyst, grading of the catalyst geometry along the reactor flow axis by stacking of catalyst with different geometric structure, such as, for example, open frontal area, wall thickness, or pore size allows for further enhancement in catalyst effectiveness and selectivity.

A further advantage of monolithic catalysts having honeycomb-type structure is that the pressure drop through the catalyst bed is less affected by coke formation as compared with randomly packed beds. As coke builds up and coats the external surfaces of the catalyst, the open area for gas flow typically is reduced and pressure drop increases. With honeycomb catalysts, the flow regime inside the channels is laminar under practical conditions and the pressure drop increases linearly with the gas velocity, i.e., a reduction in open area. For random packings the pressure drop is related to the square of the velocity, i.e., the square of the open area. Consequently, reactors comprising honeycomb catalyst are much less sensitive to coking.

As those skilled in the art will appreciate, numerous changes and modifications can be made to the preferred embodiments of the invention without departing from the spirit of the invention. It is intended that all such variations fall within the scope of the invention.

Throughout this specification, various groupings are employed to conveniently describe constituent variables of compounds and groups of various related moieties. It is specifically intended that each occurrence of such groups throughout this specification include every possible subcombination of the members of the groups, including the individual members thereof.

It is intended that each of the patents, applications, and printed publications mentioned in this patent document be hereby incorporated by reference in their entirety.

EXAMPLES

Example 1

Revamp of a 4-bed (4-Reactor) Semi-regenerative Catalytic Reforming System Comprising Monolithic Catalyst Having Honeycomb-type Structure This example illustrates how reactors of a conventional semi-regenerative catalytic reforming system can be retrofitted with monolithic catalyst. The existing four reactors (beds) of the conventional system (base case unit) contain dense packed 1/16" trilobes. Other details of the base case unit are given in Table 2.

Monolithic catalysts of the same cell density and wall thickness are used in all four existing beds. Reactor properties like catalyst mass, pressure drop and equivalent catalyst diameter (i.e., catalyst efficiency) are given in Table 3. Note that for the monoliths the following notation is used: cell density in cells-per-square-inch (cpsi)/wall thickness in 1/1000 inch. For example, the description 400/12 represents a monolith having 400 cpsi and 12/1000" wall thickness. The benefits that the monolithic catalyst offers, such as, for example, more catalyst mass, lower pressure drop and smaller equivalent diameter (better catalyst effectiveness and selectivity) are readily apparent in Table 3. Monoliths with higher or lower void fraction (or percentage of open frontal areas) can also be used.

TABLE 2

Comparative reactor vessel data (beds I–IV) for a conventional catalytic reforming system (bed density 0.781 g/cc).

| Bed Number | I | II | III | IV | |
|---|---|---|---|---|---|
| Shell ID | 2100 | 2400 | 2450 | 3100 | mm |
| Centerpipe & Screen OD | 773 | 773 | 820 | 871 | mm |
| Centerpipe Total Length | 4685 | 4510 | 6750 | 8950 | mm |
| Centerpipe Holed Length | 3261 | 2650 | 4893 | 6828 | mm |

TABLE 2-continued

Comparative reactor vessel data (beds I–IV) for a conventional catalytic reforming system (bed density 0.781 g/cc).

| Bed Number | I | II | III | IV | |
|---|---|---|---|---|---|
| Scallop Area | 0.376 | 0.334 | 0.432 | 0.558 | m2 |
| Shell Inside Area | 3.464 | 4.524 | 4.714 | 7.548 | m2 |
| Centerpipe Outside Area | 0.469 | 0.469 | 0.528 | 0.596 | m2 |
| Catalyst Bed Pressure Drop | 3.81 | 7.27 | 4.14 | 2.61 | psi |
| Process Mass Rate | 143182 | 143182 | 176091 | 176091 | kg/hr |
| Vapor Density | 7.25 | 6.46 | 4.49 | 4.30 | kg/m3 |

TABLE 3

Base case unit parameters (under column designated "Trilobe") compared with parameters for a system with reactor vessels retrofitted with monolithic catalyst. Data are for the whole 4-reactor unit. The equivalent diameter is calculated for the sphere with same surface to volume ratio.

| | Trilobe | Monolith | | | |
|---|---|---|---|---|---|
| Catalyst | 1/16" | 500/13 | 400/14 | 400/12 | 200/20 |
| Total Catalyst Mass in tons | 62.81 | 82.98 | 80.43 | 70.55 | 81.12 |
| Relative Catalyst Mass in % | 100 | 132 | 128 | 112 | 129 |
| Total Pressure Drop in mbar | 1229 | 1147 | 865 | 697 | 439 |
| Equivalent Cat. Diameter in mm | 1.56 | 1.19 | 1.27 | 1.06 | 1.82 |
| Void Fraction in % | ca. 36 | 50.3 | 51.8 | 57.8 | 51.4 |

Example 2

Revamp of a 4-bed Semi-regenerative Unit with Staged Monolith Catalyst

In this example two embodiments are described in which different monolithic catalyst structures are used in the four beds. The catalyst structure is adjusted so that the wall thickness is higher in the downstream reactors than in the upstream reactors. This configuration reflects that in the first reactor(s) the fast reactions dominate, requiring "thinner" catalyst, whereas the slower reactions take place mainly downstream.

Comparative data for the base case (see Example 1) with dense loaded trilobes are given in Table 4. Other details of the base case unit are given in Table 2. Retrofitted monolithic catalyst cases are shown in Table 5 and 6.

TABLE 4

Data for the base case of example 2 (bed density 0.781 g/cc).

| 1/16" Trilobe Catalyst-Dense Packed Reactor Vessel | I | II | III | IV | Total |
|---|---|---|---|---|---|
| Catalyst Mass in kg | 6667 | 7701 | 14346 | 34098 | 62812 |
| Pressure Drop in mbar | 263 | 501 | 285 | 180 | 1229 |
| Relative Equivalent Pellet Diameter | 1 | 1 | 1 | 1 | |

TABLE 5

Data for a system according to the present invention having staged monolithic catalyst.

| Monolithic Catalyst Reactor Vessel | I | II | III | IV | Total |
|---|---|---|---|---|---|
| Monolith Structure | 600/6 | 200/15 | 100/30 | 50/40 | |
| Catalyst Mass in kg | 5427 | 9502 | 19929 | 40289 | 75147 |
| Pressure Drop in mbar | 110 | 45 | 84 | 37 | 276 |
| Relative Equivalent Pellet Diameter | 0.32 | 0.83 | 1.78 | 2.34 | |

TABLE 6

Data for a system according to the present invention having staged monolithic catalyst.

| Monolithic Catalyst Reactor Vessel | I | II | III | IV | Total |
|---|---|---|---|---|---|
| Monolith Structure | 600/7 | 600/12 | 600/15 | 400/17 | |
| Catalyst Mass in kg | 6248 | 12564 | 23440 | 46818 | 89070 |
| Pressure Drop in mbar | 124 | 209 | 760 | 409 | 1502 |
| Relative Equivalent Pellet Diameter | 0.38 | 0.71 | 0.95 | 1.04 | |

As can be readily seen, a higher catalyst mass can be obtained for systems comprising honeycomb-type catalyst than for conventional systems comprising random packed catalyst. The system of Table 5 shows a 4.45 times lower pressure drop than for the conventional system of Table 4. This effect can help de-bottleneck the compressor in the event system capacity is increased. The system of Table 6 shows comparable overall pressure drop but 42% more catalyst mass at a smaller or almost equal effective pellet diameter (e.g., higher or equal catalyst effectiveness) in all four beds.

What is claimed is:

1. A semi-regenerative process for catalytic reforming of naphtha, said process comprising passing naphtha in the gas phase and a recycle gas containing excess hydrogen through at least one reactor comprising a monolithic catalyst having honeycomb-type structure, wherein said naphtha passes through said reactor along a flow path from a reactor inlet to a reactor outlet.

2. The process of claim 1 wherein said flow path is substantially axial, wherein the recycle gas is present in a molar ratio of 3–8 to the naptha, and wherein the process is carried out at a pressure in the range of 17–45 bar.

3. The process of claim 1 wherein geometry of said monolithic catalyst varies along said flow path.

4. The process of claim 3 wherein wall thickness of said monolithic catalyst varies along said flow path.

5. The process of claim 4 wherein said wall thickness increases or decreases along said flow path in the direction of flow.

6. The process of claim 3 wherein equivalent diameter of said monolithic catalyst varies along said flow path.

7. The process of claim 6 wherein said equivalent diameter increases or decreases along said flow path in the direction of flow.

8. The process of claim 1 wherein composition of said monolithic catalyst varies along said flow path.

9. The process of claim 1 wherein said monolithic catalyst comprises gamma alumina.

10. The process of claim 9 wherein said gamma alumina is coated on a ceramic honeycomb material.

11. The process of claim 1 wherein said monolithic catalyst comprises Pt, Pd, Re, Ir, or Sn.

12. The process of claim 1 wherein said monolithic catalyst comprises chloride.

13. The process of claim 1 wherein said monolithic catalyst comprises substantially uniform geometry along said flow path.

14. The process of claim 1 wherein said monolithic catalyst has an open frontal area percentage of from about 25 to about 90%, a cell density of from about 10 to about 2000 cpsi, and a wall thickness of from about 50 to about 1000 $\mu$m.

15. The process of claim 1 wherein said reactor further comprises heat exchange surfaces.

16. A process for catalytic reforming of naphtha, said process comprising feeding said naphtha and a recycle gas containing excess hydrogen in a molar ratio of naptha to recycle gas of 3–8 to a system comprising a plurality of reactors connected in series, said plurality of reactors comprising a first reactor and at least one subsequent reactor, wherein each reactor of said plurality of reactors comprises a monolithic catalyst having honeycomb-type structure, and wherein said naphtha passes through said plurality of reactors sequentially beginning at said first reactor.

17. The process of claim 16 wherein at least one reactor of said plurality of reactors comprises an axial flow path.

18. The process of claim 16 comprising three or four reactors.

19. The process of claim 16 wherein said monolithic catalyst of at least two reactors of said plurality of reactors comprises substantially the same geometry.

20. The process of claim 16 wherein said monolithic catalyst of at least two reactors of said plurality of reactors comprises different geometry.

21. The process of claim 16 wherein the percentage of open frontal area of said monolithic catalyst of said first reactor is highest.

22. The process of claim 16 wherein equivalent diameter of said monolithic catalyst of said first reactor is smallest.

23. The process of claim 16 wherein wall thickness of said monolithic catalyst of said first reactor is smallest.

* * * * *